(12) United States Patent
Nieland et al.

(10) Patent No.: US 12,406,167 B2
(45) Date of Patent: Sep. 2, 2025

(54) WIRE PAD DESIGN OF A CONNECTION PAD IN A PRELAM BODY OF A SMART CARD, PRELAM BODY, SMART CARD, METHOD OF FORMING A WIRE PAD DESIGN, AND METHOD OF FORMING A SMART CARD

(71) Applicant: LINXENS HOLDING, Mantes la Jolie (FR)

(72) Inventors: Carsten Nieland, Dresden (DE); Fycommee Akkadech, Ayuthaya (TH)

(73) Assignee: LINXENS HOLDING, Mantes la Jolie (FR)

( * ) Notice: Subject to any disclaimer, the term of this patent is extended or adjusted under 35 U.S.C. 154(b) by 0 days.

(21) Appl. No.: 18/580,019

(22) PCT Filed: Aug. 27, 2021

(86) PCT No.: PCT/IB2021/000828
§ 371 (c)(1),
(2) Date: Jan. 17, 2024

(87) PCT Pub. No.: WO2023/026071
PCT Pub. Date: Mar. 2, 2023

(65) Prior Publication Data
US 2024/0338547 A1    Oct. 10, 2024

(51) Int. Cl.
*G06K 19/077*        (2006.01)
(52) U.S. Cl.
CPC . *G06K 19/07722* (2013.01); *G06K 19/07754* (2013.01)
(58) Field of Classification Search
CPC ....... G06K 19/07749; G06K 19/07769; G06K 19/0775; G06K 19/07745;
(Continued)

(56) References Cited

U.S. PATENT DOCUMENTS

2008/0283615 A1   11/2008   Finn
2017/0220919 A1*   8/2017   Gragnic ........... G06K 19/07775
2018/0341846 A1*  11/2018   Finn ................. G06K 19/07754

FOREIGN PATENT DOCUMENTS

CA    3058293 A1 * 11/2018   ........... B23K 26/361
EP    3159832 A1    4/2017
(Continued)

OTHER PUBLICATIONS

Kleeman, "Lower cost smart ID cards" (Year: 2008).*
(Continued)

*Primary Examiner* — Thien T Mai
(74) *Attorney, Agent, or Firm* — DITTHAVONG, STEINER & MLOTKOWSKI

(57) ABSTRACT

In aspects, the present invention relates to a wire pad design of a connection pad in a prelam body of a smart card, to a prelam body with at least one such connection pad embedded into a substrate, to a smart card comprising such a prelam body, to a method of forming a wire pad design of a connection pad of a prelam body of a smart card, and to a method of forming a smart card. In some illustrative embodiments, a wire pad design of a connection pad in a prelam body of a smart card is provided, the wire pad design comprising a connection pad wiring pattern formed by plural wire portions extending in a contacting pad plane, and a bridging wire portion which at least partially extends outside the contacting pad plane. The bridging wire portion electrically and mechanically connects at least some of the plural wire portions with each other.

23 Claims, 6 Drawing Sheets

(58) Field of Classification Search
CPC ....... G06K 19/07783; G06K 19/07794; G06K 19/07754; G06K 19/07743; G06K 19/077; G06K 19/07779; G06K 19/07747; G06K 19/07773; G06K 19/07722; G06K 19/07771; G06K 19/0722; G06K 19/067; G06K 19/0772; G06K 19/07733; G06K 19/0723
See application file for complete search history.

(56) References Cited

FOREIGN PATENT DOCUMENTS

| EP | 4266017 A2 * | 10/2023 | ............. G01K 1/024 |
|----|--------------|---------|--------------------------|
| WO | 2015097400 A1 | 7/2015 | |

OTHER PUBLICATIONS

Fully Process-Compatible Layout Design on Bond Pad to Improve Wire Bond Reliability in CMOS ICs (Year: 2002).*
International Search Report and Written Opinion of the International Searching Authority for related International Application No. PCT/IB2021/000828, dated Apr. 22, 2022, 12 pages.

* cited by examiner

WIRE PAD DESIGN OF A CONNECTION PAD IN A PRELAM BODY OF A SMART CARD, PRELAM BODY, SMART CARD, METHOD OF FORMING A WIRE PAD DESIGN, AND METHOD OF FORMING A SMART CARD

RELATED APPLICATION

The U.S. National Phase application claims priority to International Application No. PCT/IB2021/000828, entitled "WIRE PAD DESIGN OF A CONNECTION PAD IN A PRELAM BODY OF A SMART CARD, PRELAM BODY, SMART CARD, METHOD OF FORMING A WIRE PAD DESIGN, AND METHOD OF FORMING A SMART CARD," filed Aug. 27, 2021, the entire contents of which is hereby incorporated by reference.

FIELD OF THE INVENTION

The present invention relates to a wire pad design of a connection pad in a prelam body of a smart card, to a prelam body with at least one such connection pad embedded into a substrate, to a smart card comprising such a prelam body, to a method of forming a wire pad design of a connection pad of a prelam body of a smart card, and to a method of forming a smart card.

BACKGROUND

Typically, a smart card is a plastic card having the size of a credit card, with electrical interconnections among one or more internal chip modules and/or contacts to outside chip modules. Upon integrating different modules into the body of a smart card, at least some of a variety of different functions maybe implemented with a smart card, e.g. functions for transmitting, storing and/or processing data. For example, a smart card may be equipped with a memory chip and/or a processor and/or an antenna module allowing wireless communication with the card, and an optional external contact for contacting the smart card via external contacting means.

As the space available in a card for implementing different functions is limited and there are different ISO/IEC standards to be fulfilled, constraints are imposed on a smart card and any of its components, the task of increasing the functionality of smart cards becomes more and more complex. For example, when using chip modules with a plurality of input/output (I/O) terminals when integrating an increasing number of functions into a smart card, a required number of internal contact terminals increases within a card body and it becomes increasingly difficult to place the required number contact terminals for contacting the chip modules in a dense manner in the card body among the other components, without impairing the proper functioning of the contact terminals.

A common way of providing internal contact terminals as contacting interfaces between internal interconnections routed within a card body and the module(s) embedded into the card body, may be achieved by connection pads in form of wire pads. Typically, a wire pad is provided in that a wire ending of a wire is routed in the card body in form of an areal wire pattern so as to form a connection pad covering enough area for allowing a reliable contacting of the wire pad to a respective terminal of a module to be contacted, accounting for tolerances in the size of the respective terminal to be contacted and possible placement errors in the placement of the module.

In view of the above-described situation, it is desirable to provide a wire pad design of a connection pad in a prelam body of a smart card, which allows for an increased density of connection pads without deteriorating any contacting of the connection pads with respective module terminals. Furthermore, it is desirable to provide a prelam body in a smart card having connection pads with such a wire pad design, as well as to provide a method of forming a wire pad design and a method of forming a smart card with such a wire pad design.

SUMMARY OF THE DISCLOSURE

In a first aspect of the present disclosure, a wire pad design of a connection pad in a prelam body of a smart card is provided. In accordance with illustrative embodiments of the first aspect, the wire pad design comprises a connection pad wiring pattern formed by plural wire portions extending in a contacting pad plane, and a bridging wire portion which at least partially extends outside the contacting pad plane. The bridging wire portion electrically and mechanically connects at least some of the plural wire portions with each other.

In the present disclosure, the expression "prelam body", as used herein, is understood as representing a prelaminated body with one or more layers of an insulating material, such as PVC, PC or some other appropriate thermoplastic polymer. In particular, the expression "prelam body" may denote an inlay formed of one layer which is inserted into a recess of a body as an inlay (provided in appropriate dimensions), such as an inlay inserted into a smart card. Alternatively, the expression "prelam body" may denote multiple layers, which are pre-laminated together. In any case, a prelaminated body may be considered as representing an intermediate product obtained during fabrication of a smart card. For example, an illustrative prelam body being formed of multiple layers may be obtained by fusing together different layers of a thermoplastic material into a single homogeneous sheet body, thereby forming a monolithic substrate body. In some illustrative examples, a prelam body, the substrate body (or base substrate) may have at least one contact and/or interconnection embedded therein, optionally with one or more electronic modules integrated into the substrate body in electric connection with at least one contact and/or interconnection of the substrate body.

In the wire pad design of the first aspect, the connection pad wiring pattern is kept in electrical connection by the bridging wire portion in case that these wire portions of the connection pad wiring pattern are disconnected when integrating a module into the prelam body. That is, the bridging wire portion maintains an electrical connection among the wire portions connected via the bridging wire portion. In some special illustrative example herein, the bridging wire portion extends outside the contacting pad plane so as to electrically connect all the wire portions of the connection pad wiring pattern in the contacting pad plane with each other such that upon partially removing the connection pad wiring pattern, the remaining wiring portions are in electrical connection with each other, thereby maintaining the function of the wire pad.

In accordance with some illustrative embodiments of the first aspect, at least some of the wire portions may partially extend in parallel such that a high density of wire portion at a compact design may be realized. According to some special illustrative examples herein, a turning portion may be located between each two wire portions extending in parallel with each other, the bridging wire portion substantially extending across the parallel wire portions. Accordingly, an electrical connection among the parallel wire portions may be easily established by the bridging wire portion. For example, the bridging wire portion may be arranged at a first side of the connection pad wiring pattern near turning portions such that upon removing turning portions at a second side opposite the first side, the wire portions remain in electrical connection.

In accordance with some illustrative embodiments of the first aspect, the connection pad wiring pattern may be a spirally shaped routing pattern or a meander-like routing pattern or a pattern of plural circular shaped forms which partially overlap each other. Accordingly, different advantageous forms of a wiring pattern may be realized for best matching with terminals of a module to be contacted.

In accordance with some illustrative embodiments of the first aspect, a wiring density of the connection pad wiring pattern may be locally varying. For example, a wiring density may be given by a number of wire portions in a given area segment of the prelam body. A locally varying wiring density may allow to locally increase a connectivity of the wire pad design with terminals of a module to be connected by the wire pad design.

In accordance with some illustrative embodiments of the first aspect, a ratio of wire diameter to wire pitch of the wire portions in the connection pad wiring pattern may be in a range from about 0.3 to about 0.95, thereby allowing to achieve an advantageous connectability. According to some special illustrative examples herein, the connection pad wiring pattern may have at least one first portion in which the ratio is in the range from about 0.3 to about 0.8 and at least one second portion in which the ratio ration is in the range greater than 0.8 and smaller than or equal to about 0.95, thereby easily realizing a connection pad wiring pattern with locally varying density.

In some illustrative embodiments of the first aspect, the plural wire portions may have a wire pitch of at least 300 µm, preferably of at least 200 µm, more preferably of at least 100 µm, and may have a diameter in a range from about 50 µm to about 300 µm, preferably in a range from about 50 µm to about 200 µm or from about 80 µm to about 300 µm, more preferably from about 80 µm to about 200 µm.

In accordance with illustrative embodiments of the first aspect, the wire portions may be made of copper, a copper alloy or a copper tin alloy or aluminum or an aluminum alloy, preferably at least some of the plurality of wires may be at least partially covered by an insulating coating or may not be covered.

In a second aspect of the present disclosure, a prelam body is provided. In accordance with illustrative embodiments of the second aspect, the prelam body has a substrate with at least one connection pad embedded into the substrate, the at least one connection pad being formed in accordance with the wire pad design of the first aspect.

In the prelam body of the second aspect, the connection pad wiring pattern is kept in electrical connection by the bridging wire portion in case that these wire portions of the connection pad wiring pattern are disconnected when forming an opening in the prelam body for integrating a module into the prelam body. That is, the bridging wire portion maintains an electrical connection among the wire portions connected via the bridging wire portion. In some special illustrative example herein, the bridging wire portion extends outside the contacting pad plane so as to electrically connect all the wire portions of the connection pad wiring pattern in the contacting pad plane with each other such that upon partially removing the connection pad wiring pattern, the remaining wiring portions are in electrical connection with each other, thereby maintaining the function of the wire pad.

In accordance with some illustrative embodiments of the second aspect, the prelam body may further comprise of a first recess formed in the substrate below the connection pad wiring pattern, the first recess at least partially extending into the substrate along a thickness direction of the substrate. Accordingly, the bridging wire portion may be advantageously located below the connection pad wiring pattern in the substrate or the recess may be used for compensation of substrate material displaced when embedding the connection pad wiring pattern into the substrate.

In accordance with illustrative embodiments of this aspect, the bridging wire portion may be accommodated into the first recess, thereby allowing to arrange the bridging wire portion below the connection pad wiring pattern in the substrate. Accordingly, the bridging wire portion may be protected against accidental removal when exposing the connection pad wiring pattern in the prelam body.

In accordance with illustrative embodiments of the second aspect, the prelam body may further comprise a second recess formed in the substrate below the connection pad wiring pattern, the connection pad wiring pattern straddling over at least a part of the second recess. For example, the second recess may be formed in a layer into which the wire is embedded or the recess may be formed in a layer underlying a layer into which the wire is embedded. The second recess avoids local accumulation of substrate material in the pad area when embedding the connection pad wiring pattern in the substrate, thereby ensuring a uniform thickness in the prelam body at the connection pad wiring pattern.

In a third aspect of the present disclosure, a smart card is provided. According to illustrative embodiments of the third aspect, the smart card comprises the prelam body of the second aspect, and a module integrated into the prelam body. The module has at least one I/O terminal (this means an input/output terminal for supplying electric signals and/or electrical energy to the module and/or receiving electric signals from the module) for electrically connecting with the at least one connection pad. The module is accommodated into a cavity provided in the prelam body adjacent the at least one connection pad such that the at least one I/O terminal is brought into electrical contact with the at least one connection pad.

In the smart card of the third aspect, the connection pad wiring pattern is kept in electrical connection by the bridging wire portion, even when these wire portions of the connection pad wiring pattern are disconnected due to the integration of the module into the prelam body. That is, the bridging wire portion maintains an electrical connection among the wire portions connected via the bridging wire portion. In some special illustrative example herein, the bridging wire portion extends outside the contacting pad plane so as to electrically connect all the wire portions of the connection pad wiring pattern in the contacting pad plane with each other such that upon partially removing the connection pad wiring pattern, the remaining wiring portions are in electrical connection with each other, thereby maintaining the function of the wire pad.

In accordance with some illustrative embodiments of the third aspect, the electrical contact between the at least one I/O terminal and the at least one connection pad is formed by at least one of a solder interconnection, an adhesive interconnection using an anisotropic conductive film (ACF) or anisotropic conductive paste (ACP), and an adhesive interconnection using an isotropic conductive film or paste (ICP) glue interconnection. Accordingly, a reliable electrical interconnection between the connection pad and the module is easily realized.

In accordance with some illustrative embodiments of the third aspect, the cavity may be formed at a side of the at least one connection pad, which side is facing away from a side of the connection pad where the bridging wire portion is formed. Accordingly, the risk for damaging the bridging wire connection upon integrating the module into the smart card is reduced.

In accordance with some illustrative embodiments of the third aspect, at least one turning portion may be removed. Accordingly, an increased space for a recess at the wire pad design may be provided and/or the wire pad design may be formed closer to a recess formed in the prelam body.

In accordance with some illustrative embodiments of the third aspect, the prelam body may be of a rectangular shape in a top view with a length dimension along a length direction and a width dimension smaller than the length dimension along a width direction perpendicular to the length direction in the top view, wherein wire portions are oriented relative to the width dimension under an angle out of a range from about 45° to about 90°. Accordingly, a compact wire pad design may be realized.

In a fourth aspect of the present disclosure, a method of forming a wire pad design of a connection pad in a prelam body of a smart card is provided. In accordance with illustrative embodiments of the fourth aspect, the method comprises providing a substrate of the prelam body, forming a connection pad wiring pattern by plural wire portions on a surface of the substrate as a contacting pad plane, and forming a bridging wire portion which at least partially extends outside the contacting pad plane, wherein the bridging wire portion is in electrical and mechanical connection with at least some of the plural wire portions.

According to the method of the fourth aspect, a wire pad design is formed in which the connection pad wiring pattern is kept in electrical connection by the bridging wire portion, even when these wire portions of the connection pad wiring pattern are disconnected upon integrating a module into the prelam body. That is, the bridging wire portion maintains an electrical connection among the wire portions connected via the bridging wire portion. In some special illustrative example herein, the bridging wire portion extends outside the contacting pad plane so as to electrically connect all the wire portions of the connection pad wiring pattern in the contacting pad plane with each other such that upon partially removing the connection pad wiring pattern, the remaining wiring portions are in electrical connection with each other, thereby maintaining the function of the wire pad.

In accordance with some illustrative embodiments of the fourth aspect, the bridging wire portion may be formed to at least partially extend over the connection pad wiring pattern. Alternatively, the method may further comprise forming a first recess in the substrate prior to forming any of the connection pad wiring pattern and the bridging wire portion, and subsequently forming the bridging wire portion by accommodating a wire portion into the first recess, followed by forming the connection pad wiring pattern on the surface of the substrate outside the first recess.

In accordance with some illustrative embodiments of the fourth aspect, the method may further comprise forming a second recess in the substrate, the second recess being located at least in part below the connection pad wiring pattern, the wire portions extending across the second recess. For example, the second recess may be formed in a layer into which the wire is embedded or the recess may be formed in a layer underlying a layer into which the wire is embedded. The second recess avoids local accumulation of substrate material in the pad area when embedding the connection pad wiring pattern in the substrate, thereby ensuring a uniform thickness in the prelam body at the connection pad wiring pattern.

In a fifth aspect of the present disclosure, a method of forming a smart card is provided. In accordance with illustrative embodiments of the fifth aspect, the method comprises providing a card body formed of a prelam body with at least one connection pad embedded therein, the at least one connection pad being provided by a wire pad design formed in in accordance with the method of the fourth aspect, forming a cavity in the card body by milling the cavity into the card body so as to expose the at least one connection pad, and accommodating a module having at least one I/O terminal into a cavity adjacent the at least one connection pad such that the at least one I/O terminal is brought into electrical contact with the at least one connection pad.

According to the method of the fifth aspect, a smart card is formed in which the connection pad wiring pattern is kept in electrical connection by the bridging wire portion, even when these wire portions of the connection pad wiring pattern are disconnected upon integrating the module into the card body. That is, the bridging wire portion maintains an electrical connection among the wire portions connected via the bridging wire portion. In some special illustrative example herein, the bridging wire portion extends outside the contacting pad plane so as to electrically connect all the wire portions of the connection pad wiring pattern in the contacting pad plane with each other such that upon partially removing the connection pad wiring pattern, the remaining wiring portions are in electrical connection with each other, thereby maintaining the function of the wire pad.

BRIEF DESCRIPTION OF THE DRAWINGS

Various illustrative embodiments and other advantageous of the various aspects will become apparent from the detailed description of the accompanying figures as presented below.

The figures as accompanying the present disclosure are only provided for schematically showing some concepts of the present disclosure without showing all possible details of certain embodiments and without being actually to scale.

DETAILED DESCRIPTION

Figure 1:
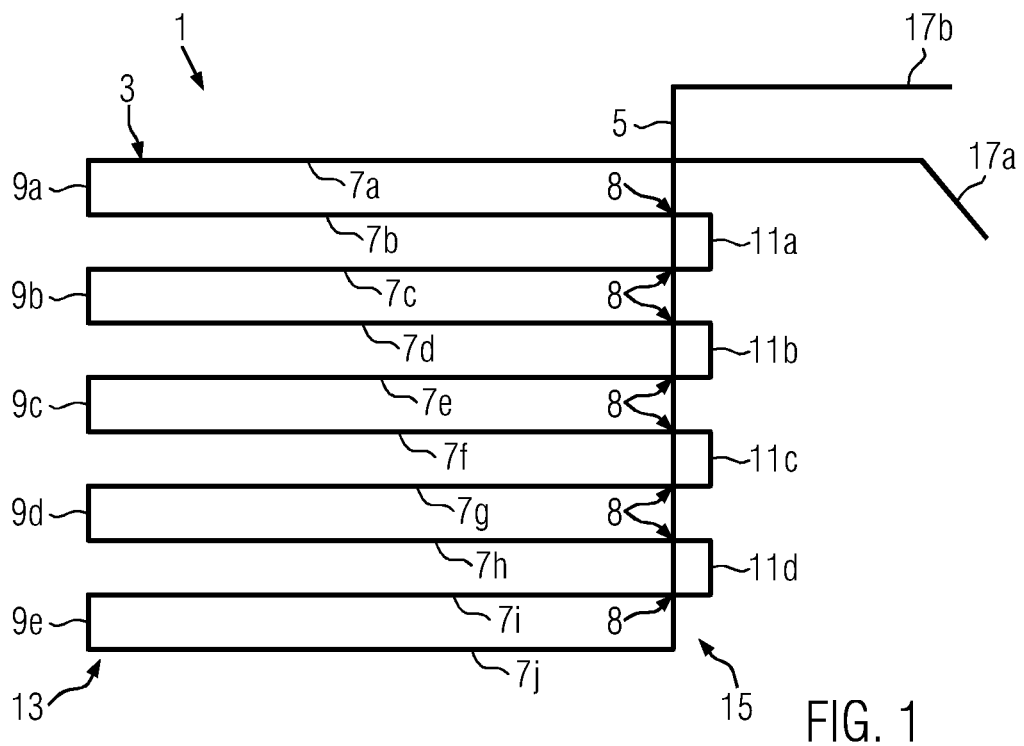
FIG. 1 schematically shows a wire pad design of a connection pad in accordance with some illustrative embodiments of the present disclosure.

Referring to FIG. 1, a wire pad design of a connection pad 1 in a prelam body (not illustrated) of a smart card (not illustrated) is schematically shown in accordance with some illustrative embodiments of the present disclosure. The wire pad design comprises a connection pad wiring pattern 3 and a bridging wire portion 5. The connection pad wiring pattern 3 is formed by plural wire portions 7a, 7b, 7c, 7d, 7e, 7f, 7g, 7h, 7i and 7j which extend in a contacting pad plane. The plural wire portions 7a to 7j are connected by turning portions 9a, 9b, 9c, 9d, 9e and turning portions 11a, 11b, 11c, 11d such that the turning portion 9a extends between the wire portions 7a and 7b, the turning portion 11a connects via portions 7b and 7c, turning portion 9b connects wire portions 7c and 7d, turning portion 11b connects wire portions 7d and 7e, turning portion 9c connects wire portions 7e and 7f, turning portion 11c connects wire portions 7f and 7g, turning portion 9d connects wire portions 7g and 7h, turning portion 11d connects wire portions 7h and 7i, and turning portion 9e connects wire portions 7i and 7j. The turning portions 9a to 9e are located at a side 13 of the connection pad wiring pattern 3 and the turning portions 11a to 11d are formed at a side 15 opposite the side 13 in a direction along which each of the wire portions 7a to 7j extends. Generally speaking, the wire portions 7a to 7j extend between the turning portions 9a to 9e and the turning portions 11a to 11d, that is from side 13 at which the turning portions 9a to 9e are located to side 15 at which the turning portions 11a to 11d are formed. Although the illustration in FIG. 1 explicitly shows the bridging wire portion 5 as being formed at side 15, this does not pose any limitation and the bridging wire portion 5 may be located at side 13, instead.

With continued reference to FIG. 1, wire end portions 17a and 17b are shown, indicating end portions of the illustrated wire forming the connection pad 1. Although the wire end portions 17a and 17b are shown as endings in the illustration of FIG. 1, this does not pose any limitation on the wire forming the connection pad 1 and at least one of the wire end portions 17a and 17b may extend to another connection pad (not illustrated) or to another internal interconnection interface (not illustrated) in the prelam body (not illustrated). According to some illustrative examples, the wire pad design shown in FIG. 1 may be formed by routing a wire to initially provide the wire end portion 17a, then form the connection pad wiring pattern 3, then form the bridging wire portion 5, and then provide the wire end portion 17b. Herein, the bridging wire portion 5 may be formed so as to straddle over the connection pad wiring pattern 3. Alternatively, the wire pad design shown in FIG. 1 may be formed by routing a wire to initially provide the wire end portion 17b, then form the bridging wire portion 5, then form the connection pad wiring pattern 3, and then provide the wire end portion 17b. Herein, the connection pad wiring pattern 3 may be formed so as to straddle over the bridging wire portion 5 or, in other words, the bridging wire portion 5 extends below the connection pad wiring pattern 3.

In the illustration of FIG. 1, the wire portions 7a to 7j extend substantially in parallel to each other, whereas the turning portions 9a to 9e and 11a to 11d extend substantially askew the wire portions 7a to 7j. In the explicit illustration of FIG. 1, the turning portions 9a to 9e and 11a to 11d are illustrated as being substantially parallel to each other. This however is not a limitation and the person skilled in the art will appreciate that only the turning portion 9a to 9e may be in parallel to each other, while only the turning portions 11a to 11d may be in parallel to each other or alternatively, only subsets of turning portions may be in parallel.

According to some illustrative embodiments, the bridging wire portion 5 as shown in FIG. 1 extends outside the contacting pad plane such that it may extend either above or below the plural wire portions 7a to 7j. The bridging wire portion 5 crosses, in the top view of FIG. 1, the wire portions 7a to 7j at a plurality of crossing points 8 at which the bridging wire portion 5 is electrically and mechanically connected to the wire portion 7a to 7j. This does not pose any limitation on the present disclosure and the person skilled in the art will appreciate that the bridging wire portion 5 may be only in electrical and mechanical contact with some of the wire portions 7a to 7j.

Referring to FIG. 1, the connection pad 1 has a wire pad design in the form of a meander like routing pattern in which wire portions 7a to 7j and turning portions 9a to 9e and 11a to 11d are arranged in a substantial zigzag shape.

With continued reference to FIG. 1, the wire portions 7a to 7j of the connection pad wiring pattern 3 are formed of a wire having a wire pitch of at least 300 μm, preferably of at least 200 μm, more preferably of at least 100 μm. Without limitation, the turning portions 9a to 9e and 11a to 11d may have an according wire pitch, as well. Additionally or alternatively, the wire portions may have a diameter in the range from about 50 μm to about 300 μm, preferably in a range from about 50 μm to about 200 μm or from about 80 μm to about 300 μm, more preferably from about 80 μm to 200 μm. Similarly, the turning portions 9a to 9e and 11a to 11d may have an according diameter as well.

In accordance with some illustrative embodiments, the wire portions 7a to 7j and/or the bridging wire portion 5 may be made of copper, copper alloy or a copper tin alloy or aluminum or an aluminum alloy, preferably at least some of the plural wire portions 7a to 7j and/or the bridging wire portion 5 may be at least partially covered by an insulating coating or may be without any covering, e.g., a copper wire with a flash of silver or a plain copper wire. In general, any electric conductive, and preferably metallic, material which may be provided as a metallic wire, conductor track or band, may be employed for at least one of the wire portions 7a to 7j and/or the bridging wire portion 5.

In accordance with some illustrative embodiments of the present disclosure and with ongoing reference to FIG. 1, a wiring density of the connection pad 1 of FIG. 1 as given by a ratio of wire diameter to wire pitch in the connection pad wiring pattern 3, may be in a range from about 0.3 to 0.95.

Figure 2:
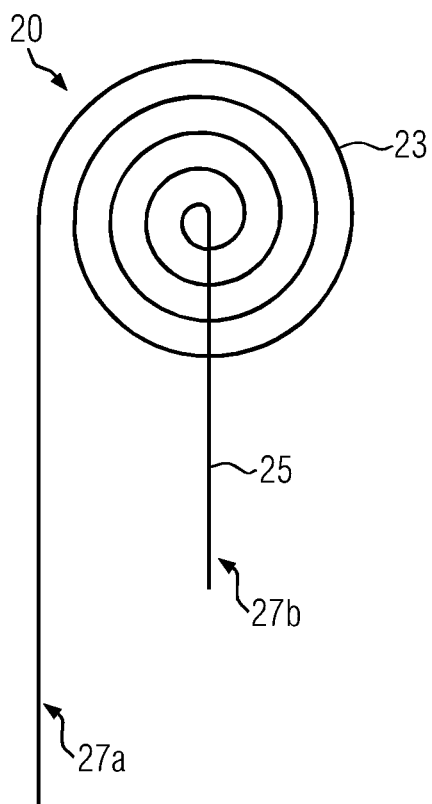
FIG. 2 schematically shows a wire pad design of a connection pad in accordance with some other illustrative embodiments of the present disclosure.

Referring to FIG. 2, a wire pad design of a connection pad 20 in a prelam body (not illustrated) of a smart card (not illustrated) is schematically shown in a top view.

As illustrated in FIG. 2, the connection pad 20 has a wire pad design comprising a connection pad wiring pattern 23 and a bridging wiring portion 25. The connection pad wiring pattern 23 is given by a spirally shaped routing pattern with plural wire portions represented by circular wire portions, concentrically wound in spiral form from an inner minimum diameter to an outer maximum diameter. The connection pad wiring pattern 23 defines a contacting pad plane in that the plural wire portions of the connection pad wiring pattern 23 are wound in a planer arrangement. The bridging wire portion 25 at least partially extends outside the contacting pad plane such that the bridging wire portion 25 extends over or underneath the connection pad wiring pattern 23 at a region of the wire portions of the connection pad wiring pattern 23. Wire ends 27a and 27b of the connection pad 20 may be arranged within the contacting pad plane or with at least one of the wire ends 27a and 27b being located outside the connection pad plane.

According to some illustrative embodiments, the wire pad design of FIG. 2 may be formed by routing a wire beginning at the wire end 27a to implement a spiral shape corresponding to the connection pad wiring pattern 23 and further routing the wire underneath or above the wire portions of the connection pad wiring pattern 23 so as to straddle over the connection pad wiring pattern 23 or run below the connection pad wiring pattern 23 at the wire portions.

In accordance with some illustrative embodiments, a pitch of the wire portions of the connection pad wiring pattern 23 may be in a range from about 100 μm to about 300 μm, e.g. at about 150 μm to about 200 μm, such as at 160 μm. A minimum diameter may be in a range from about 0.1 mm to about 0.8 mm, e.g. at about 0.5 mm. An outer diameter of the connection pad 20 may be in the range from about 1 mm to about 3 mm, e.g. at about 2 mm.

With continued reference to FIG. 2, the wire portions of the connection pad wiring pattern 23 are formed of a wire having a wire pitch of at least 300 μm, preferably of at least 200 μm, more preferably of at least 100 μm. Additionally or alternatively, the wire portions may have a diameter in the range from about 50 μm to about 300 μm, preferably in a range from about 50 μm to about 200 μm or from about 80 μm to about 300 μm, more preferably from about 80 μm to 200 μm.

In accordance with some illustrative embodiments, the wire portions of the connection pad wiring pattern 23 and/or the bridging wire portion 25 may be made of copper, copper alloy or a copper tin alloy or aluminum or an aluminum alloy, preferably at least some of the plural wire portions of the connection pad wiring pattern 23 and/or the bridging wire portion 25 may be at least partially covered by an insulating coating or may be without any covering, e.g., a copper wire with a flash of silver or a plain copper wire. In general, any electric conductive, and preferably metallic, material which may be provided as a metallic wire, conductor track or band, may be employed for at least one of the wire portions and/or the bridging wire portion 25.

In accordance with some illustrative embodiments of the present disclosure and with ongoing reference to FIG. 2, a wiring density of the connection pad 20 of as given by a ratio of wire diameter to wire pitch in the connection pad wiring pattern 23, may be in a range from about 0.3 to 0.95.

Figure 3:
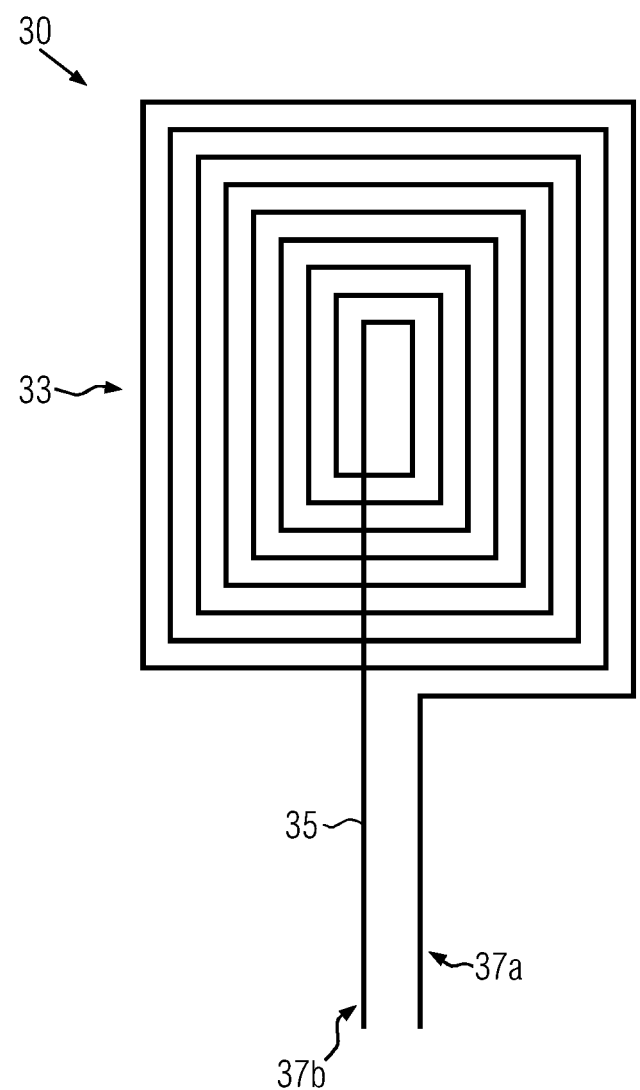
FIG. 3 schematically shows a wire pad design of a connection pad in accordance with some other illustrative embodiments of the present disclosure.

Referring to FIG. 3, a wire pad design of a connection pad 30 in a prelam body (not illustrated) of a smart card (not illustrated) is schematically shown in a top view.

As illustrated in FIG. 3, the connection pad 30 has a wire pad design comprising a connection pad wiring pattern 33 and a bridging wiring portion 35. The connection pad wiring pattern 33 is given by a spirally shaped routing pattern with plural wire portions represented by rectangular wire portions which are arranged in a concentrically wound spiral form from inside the connection pad wiring pattern 33 to an outer rectangular shape given by a length in a range from about 1 mm to about 10 mm, preferably from about 3 mm to about 8 mm, more preferably from about 5 mm to about 7 mm, such as about 6 mm, and a width (smaller than the length) in a range from about 0.5 mm to about 5 mm, preferably from about 1 mm to about 3 mm, such as about 2 mm.

According to illustrative embodiments, the connection pad wiring pattern 33 defines a contacting pad plane in that the plural wire portions of the connection pad wiring pattern 33 are wound in a planer arrangement. The bridging wire portion 35 at least partially extends outside the contacting pad plane such that the bridging wire portion 35 extends over or underneath the connection pad wiring pattern 33 at a region of the wire portions of the connection pad wiring pattern 33. Wire ends 37a and 37b of the connection pad 30 may be arranged within the contacting pad plane or with at least one of the wire ends 37a and 37b being located outside the connection pad plane.

According to some illustrative embodiments, the wire pad design of FIG. 3 may be formed by routing a wire beginning at the wire end 37a to implement the spiral, rectangular shape corresponding to the connection pad wiring pattern 33 shown in FIG. 3, and further routing the wire underneath or above the wire portions of the connection pad wiring pattern 33 so as to straddle over the connection pad wiring pattern 33 or run below the connection pad wiring pattern 33 at the wire portions.

In accordance with some illustrative embodiments, a pitch of the wire portions of the connection pad wiring pattern 33 may be in a range from about 100 μm to about 300 μm, e.g. at about 150 μm to about 200 μm, such as at 160 μm.

With continued reference to FIG. 3, the wire portions of the connection pad wiring pattern 33 are formed of a wire having a wire pitch of at least 300 μm, preferably of at least 200 μm, more preferably of at least 100 μm. Additionally or alternatively, the wire portions may have a diameter in the range from about 50 μm to about 300 μm, preferably in a range from about 50 μm to about 200 μm or from about 80 μm to about 300 μm, more preferably from about 80 μm to 200 μm.

In accordance with some illustrative embodiments, the wire portions of the connection pad wiring pattern 33 and/or the bridging wire portion 35 may be made of copper, copper alloy or a copper tin alloy or aluminum or an aluminum alloy, preferably at least some of the plural wire portions of the connection pad wiring pattern 33 and/or the bridging wire portion 35 may be at least partially covered by an insulating coating or may not be covered.

In accordance with some illustrative embodiments of the present disclosure and with ongoing reference to FIG. 3, a wiring density of the connection pad 30 of as given by a ratio of wire diameter to wire pitch in the connection pad wiring pattern 33, may be in a range from about 0.3 to 0.95.

Although FIG. 3 shows a connection pad wiring pattern 30 in the form of a spirally wound rectangular with rectangular wire portions, this does not pose any limitation on the present disclosure and the person skilled in the art will appreciate that a connection pad wiring pattern in the form of a spirally wound square with square shaped wire portions may be provided, where length and width of the connection pad wiring pattern is equal.

Figure 4:
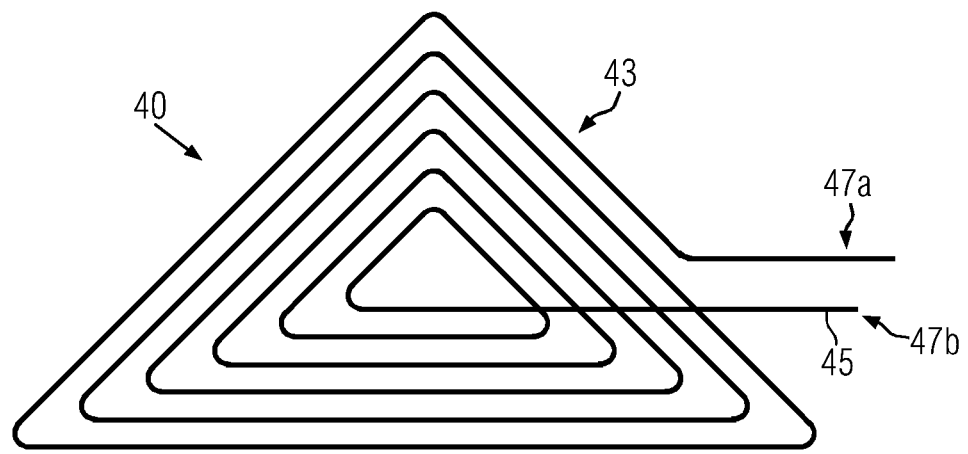
FIG. 4 schematically shows a wire pad design of a connection pad in accordance with some other illustrative embodiments of the present disclosure.

Referring to FIG. 4, a wire pad design of a connection pad 40 in a prelam body (not illustrated) of a smart card (not illustrated) is schematically shown in a top view.

As illustrated in FIG. 4, the connection pad 40 has a wire pad design comprising a connection pad wiring pattern 43 and a bridging wiring portion 45. The connection pad wiring pattern 43 is given by a spirally shaped routing pattern with plural wire portions represented by triangular wire portions which are arranged in a concentrically wound spiral form from inside the connection pad wiring pattern 43 to an outer triangular shape given by a side length in a range from about 1 mm to about 10 mm, preferably from about 2 mm to about 8 mm, more preferably from about 3 mm to about 5 mm, such as about 4 mm. In a special illustrative but non-limiting example, the triangle may be regular triangle with equal side length.

According to illustrative embodiments, the connection pad wiring pattern 43 defines a contacting pad plane in that the plural wire portions of the connection pad wiring pattern 43 are wound in a planer arrangement. The bridging wire portion 45 at least partially extends outside the contacting pad plane such that the bridging wire portion 45 extends over or underneath the connection pad wiring pattern 43 at a region of the wire portions of the connection pad wiring pattern 43. Wire ends 47a and 47b of the connection pad 40 may be arranged within the contacting pad plane or with at least one of the wire ends 47a and 47b being located outside the connection pad plane.

According to some illustrative embodiments, the wire pad design of FIG. 4 may be formed by routing a wire beginning at the wire end 47a to implement the spiral, triangular shape corresponding to the connection pad wiring pattern 43 shown in FIG. 4, and further routing the wire underneath or above the wire portions of the connection pad wiring pattern 43 so as to straddle over the connection pad wiring pattern 43 or run below the connection pad wiring pattern 43 at the wire portions.

In accordance with some illustrative embodiments, a pitch of the wire portions of the connection pad wiring pattern 43 may be in a range from about 100 μm to about 300 μm, e.g. at about 150 μm to about 200 μm, such as at 160 μm.

With continued reference to FIG. 4, the wire portions of the connection pad wiring pattern 43 are formed of a wire having a wire pitch of at least 300 μm, preferably of at least 200 μm, more preferably of at least 100 μm. Additionally or alternatively, the wire portions may have a diameter in the range from about 50 μm to about 300 μm, preferably in a range from about 50 μm to about 200 μm or from about 80 μm to about 300 μm, more preferably from about 80 μm to 200 μm.

In accordance with some illustrative embodiments, the wire portions of the connection pad wiring pattern 43 and/or the bridging wire portion 45 may be made of copper, copper alloy or a copper tin alloy or aluminum or an aluminum alloy, preferably at least some of the plural wire portions of the connection pad wiring pattern 43 and/or the bridging wire portion 45 may be at least partially covered by an insulating coating or may be without any covering, e.g., a copper wire with a flash of silver or a plain copper wire. In general, any electric conductive, and preferably metallic, material which may be provided as a metallic wire, conductor track or band, may be employed for at least one of the wire portions and/or the bridging wire portion 45.

In accordance with some illustrative embodiments of the present disclosure and with ongoing reference to FIG. 4, a wiring density of the connection pad 40 of as given by a ratio of wire diameter to wire pitch in the connection pad wiring pattern 43, may be in a range from about 0.3 to 0.95.

Figure 5:
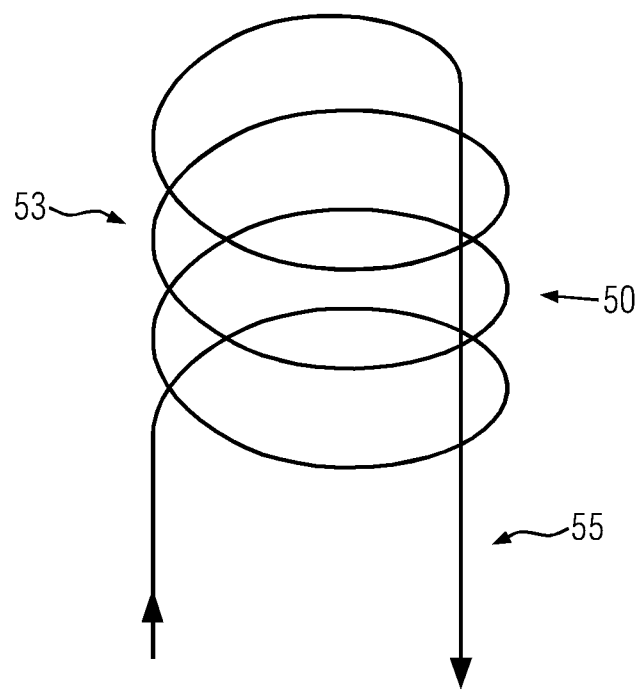
FIG. 5 schematically shows a wire pad design of a connection pad in accordance with some other illustrative embodiments of the present disclosure.

Referring to FIG. 5, a wire pad design of a connection pad 50 in a prelam body (not illustrated) of a smart card (not illustrated) is schematically shown in a top view.

As illustrated in FIG. 5, the connection pad 50 has a wire pad design comprising a connection pad wiring pattern 53 and a bridging wiring portion 55. The connection pad wiring pattern 53 is given by a circular shaped wire portions where a center of each circular wire portion is displaced with regard to the other wire portions such that the connection pad wiring pattern 53 is given by a series of partially overlapping wire portions. A length of the connection pad wiring pattern 53 may be in a range from about 1 mm to about 10 mm, preferably from about 3 mm to about 8 mm, such as about 4 mm, and a width (smaller than the length) in a range from about 0.5 mm to about 5 mm, preferably from about 1 mm to about 3 mm, such as about 2 mm. For example, the width may correspond to a diameter of a circular wire portion in case that the series of wire portions is displaced such that centers of the wire portions are located on a straight line.

According to illustrative embodiments, the connection pad wiring pattern 53 defines a contacting pad plane in that the plural wire portions of the connection pad wiring pattern 53 are wound in a planer arrangement. The bridging wire portion 55 at least partially extends outside the contacting pad plane such that the bridging wire portion 55 extends over or underneath the connection pad wiring pattern 53 at a region of the wire portions of the connection pad wiring pattern 53. Wire ends 57a and 57b of the connection pad 50 may be arranged within the contacting pad plane or with at least one of the wire ends 57a and 57b being located outside the connection pad plane.

According to some illustrative embodiments, the wire pad design of FIG. 5 may be formed by routing a wire beginning at the wire end 57a to implement the shape of partially overlapping circular portions corresponding to the connection pad wiring pattern 53 shown in FIG. 5, and further routing the wire underneath or above the wire portions of the connection pad wiring pattern 53 so as to straddle over the connection pad wiring pattern 53 or run below the connection pad wiring pattern 53 at the wire portions.

In accordance with some illustrative embodiments, a pitch of the wire portions of the connection pad wiring pattern 53 may be in a range from about 100 μm to about 300 μm, e.g. at about 150 μm to about 200 μm, such as at 160 μm.

With continued reference to FIG. 5, the wire portions of the connection pad wiring pattern 53 are formed of a wire having a wire pitch of at least 300 μm, preferably of at least 200 μm, more preferably of at least 100 μm. Additionally or alternatively, the wire portions may have a diameter in the range from about 50 μm to about 300 μm, preferably in a range from about 50 μm to about 200 μm or from about 80 μm to about 300 μm, more preferably from about 80 μm to 200 μm.

In accordance with some illustrative embodiments, the wire portions of the connection pad wiring pattern 53 and/or the bridging wire portion 55 may be made of copper, copper alloy or a copper tin alloy or aluminum or an aluminum alloy, preferably at least some of the plural wire portions of the connection pad wiring pattern 53 and/or the bridging wire portion 55 may be at least partially covered by an insulating coating or may be without any covering.

In accordance with some illustrative embodiments of the present disclosure and with ongoing reference to FIG. 5, a wiring density of the connection pad 50 of as given by a ratio of wire diameter to wire pitch in the connection pad wiring pattern 53, may be in a range from about 0.3 to 0.95.

Although the wire portions of the connection pad wiring patterns 20 and 50 as described above with regard to FIGS. 2 and 5 are described as of circular shapes, this does not necessarily mean that the wiring portions resemble a circle in shape but may be of an oval shape or of a shape that may be obtained by continuously deforming a circle.

Figure 6:
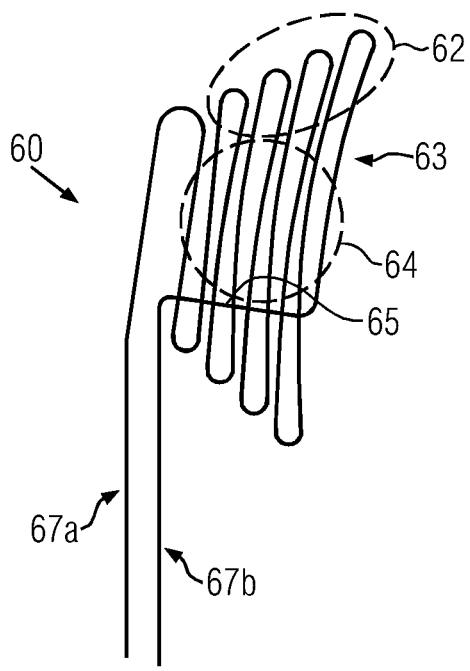
FIG. 6 schematically illustrates a wire pad design of a connection pad in accordance with some other illustrative embodiments of the present disclosure.

Referring to FIG. 6, a wire pad design of a connection pad 60 is shown which has a connection pad wiring pattern 63 and a bridging wire portion 65. The connection pad wiring pattern as shown in FIG. 6, is a meander like routing pattern, however, in an irregular shape. In other words, the wire portions of the connection pad wiring pattern are not in parallel or concentric with each other but only at most partially in parallel (that is, parts of some wire portions may be in parallel). Additionally or alternatively, the wire portions of the connection pad wiring pattern may have a different length dimensions such that an irregular shape, such as a trapezoidal shape of the connection pad wiring pattern 63 as shown in the top view of FIG. 6, is provided. Due to the wire portions of the connection pad wiring pattern 63 not being in parallel to each other, a wiring density of the connection pad wiring pattern 63 may be locally different, that is, a varying density at different places of the connection pad wiring pattern 63 may be different.

In accordance with some illustrative examples, the wire portions of the connection pad wiring pattern 60 may be curved portions and a connection pad wiring pattern 63 with varying wiring density may be achieved. A wiring density may be understood as representing the number of wire portions in a given area or a wire density may be characterized by a ratio of wire pitch to wire diameter or vis-versa.

According to illustrative embodiments, the connection pad wiring pattern 63 defines a contacting pad plane in that the plural wire portions of the connection pad wiring pattern 63 are wound in a planer arrangement. The bridging wire portion 65 at least partially extends outside the contacting pad plane such that the bridging wire portion 65 extends over or underneath the connection pad wiring pattern 63 at a region of the wire portions of the connection pad wiring pattern 63. Wire ends 67a and 67b of the connection pad 60 may be arranged within the contacting pad plane or with at least one of the wire ends 67a and 67b being located outside the connection pad plane.

According to some illustrative embodiments, the wire pad design of FIG. 6 may be formed by routing a wire beginning at the wire end 67a to implement the irregular shape corresponding to the connection pad wiring pattern 63 shown in FIG. 6, and further routing the wire underneath or above the wire portions of the connection pad wiring pattern 63 so as to straddle over the connection pad wiring pattern 63 or run below the connection pad wiring pattern 63 at the wire portions.

In accordance with some illustrative embodiments, a pitch of the wire portions of the connection pad wiring pattern 63 may be in a range from about 100 μm to about 300 μm, e.g. at about 150 μm to about 200 μm, such as at 160 μm.

With continued reference to FIG. 6, the wire portions of the connection pad wiring pattern 63 are formed of a wire having a wire pitch of at least 300 μm, preferably of at least 200 μm, more preferably of at least 100 μm. Additionally or alternatively, the wire portions may have a diameter in the range from about 50 μm to about 300 μm, preferably in a range from about 50 μm to about 200 μm or from about 80 μm to about 300 μm, more preferably from about 80 μm to 200 μm.

In accordance with some illustrative embodiments, the wire portions of the connection pad wiring pattern 63 and/or the bridging wire portion 65 may be made of copper, copper alloy or a copper tin alloy or aluminum or an aluminum alloy, preferably at least some of the plural wire portions of the connection pad wiring pattern 63 and/or the bridging wire portion 65 may be at least partially covered by an insulating coating or may be without any covering, e.g., a copper wire with a flash of silver or a plain copper wire. In general, any electric conductive, and preferably metallic, material which may be provided as a metallic wire, conductor track or band, may be employed for at least one of the wire portions and/or the bridging wire portion 65.

In accordance with some illustrative embodiments of the present disclosure and with ongoing reference to FIG. 6, a wiring density of the connection pad 60 of as given by a ratio of wire diameter to wire pitch in the connection pad wiring pattern 63, may be in a range from about 0.3 to 0.95.

Figure 7:
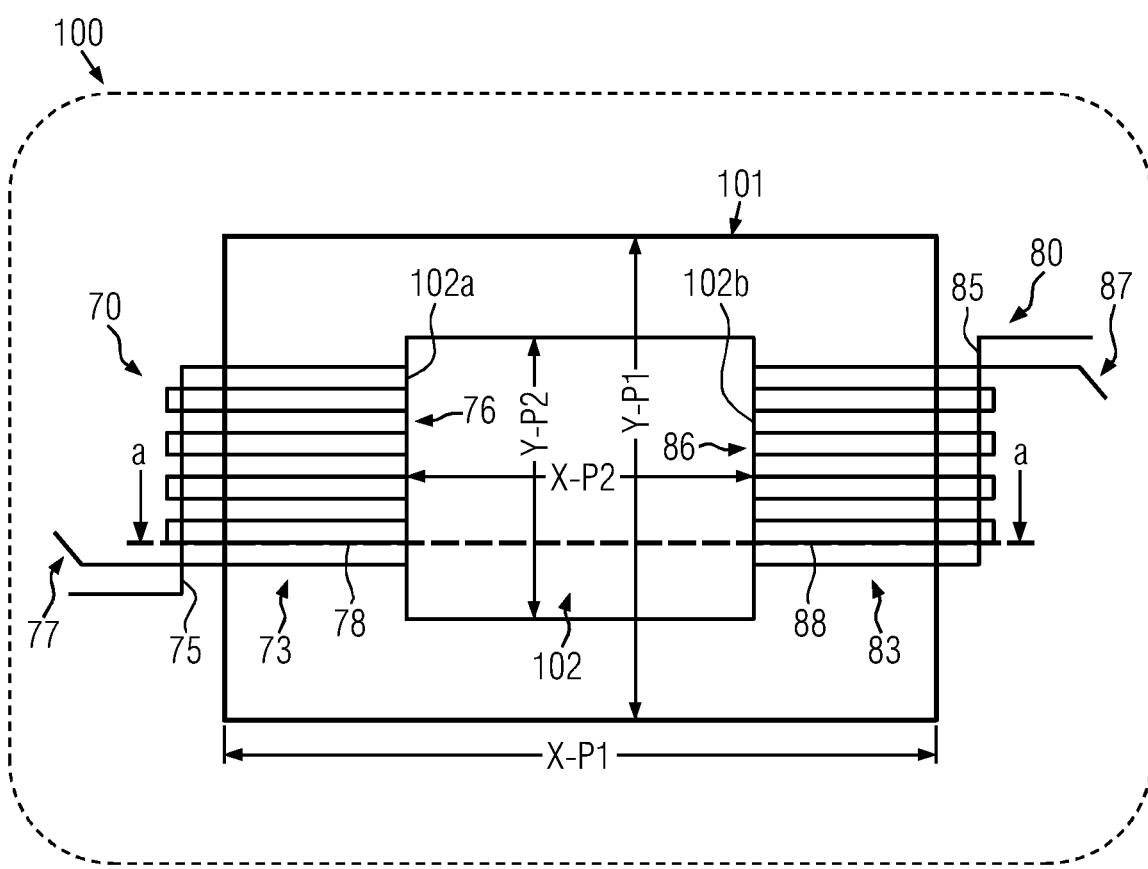
FIG. 7 schematically shows a prelam body with connection pads according to a wire pad design of a connection pad in accordance with some illustrative embodiments of the present disclosure.

Referring to FIG. 7, a portion of a card body formed of a prelam body is schematically illustrated in an enlarged top view. The card body may be provided by subjecting a prelam body to further processing for forming a card body which may be used for further fabricating a smart card. In the embodiments described below, the card body may comprise a substrate 100.

According to illustrative embodiments as shown in FIG. 7, a connection pad 70 and a connection pad 80 are embedded into the substrate 100 for contacting terminals (not illustrated) of a module (not illustrated), which is to be integrated into the card body. As shown in FIG. 7, each of the connection pads 70 and 80 are realized similar to the connection pad 1 shown in FIG. 1. In the illustrated example, each of the connection pads 70 and 80 in FIG. 7 is given by a meander like routing pattern. However, this does not pose any limitation on the present disclosure and at least one of the connection pads 70 and 80 may be replaced by a connection pad according to the connection pads illustrated in FIGS. 2 to 6, instead.

With ongoing reference to FIG. 7, a cavity 101 is shown, together with an option cavity 102. The cavity 101 is formed so as to accommodate a module (not illustrated) which is to be integrated into the card body. The person skilled in the art will appreciate that, depending on the module to be integrated into the substrate 100, it may be necessary to further provide a cavity 102 in addition to the cavity 101. Accordingly, the cavity 102 is optional.

As shown in FIG. 7, the cavity 101 has dimensions in X and Y directions, indicated by double arrows X-P2 and Y-P1. Accordingly, a dimension of the cavity 101 along the X direction is given by dimension X-P1 while a dimension of the cavity 101 along the Y direction is given by dimension Y-P1. Similarly, dimensions of the cavity 102 are given by dimension X-P2 indicating a dimension along the X direction and dimension Y-P2 indicating a dimension along the Y direction. It is noted that the directions X and Y, which correspond to respective dimensions X-P1/X-P2 and Y-P1/Y-P2, correspond to X and Y directions of a card body which are in accordance with according directions of a finished smart card accounting for a correct orientation of the smart card given by a length dimension (corresponding to a maximum length dimension) and a width dimension (corresponding to a dimension smaller than the length dimension).

According to illustrative embodiments and as illustrated in FIG. 7, an orientation of the wire portions of a connection pad wiring pattern 73, 83 of a respective one of the connection pads 70 and 80 is substantially perpendicular to a Y direction, and an angle between the wire portions and the Y direction can be in a range from about 45° to 90°. Due to the orientation of the connection pads 70 and 80 as shown in FIG. 7, it is possible to increase the number of connection pads without being in conflict with each other due to a limited space of the cavities 101.

With ongoing reference to FIG. 7, each of the connection pads 70 and 80 has a respective bridging wire portion 75 and 85, which connects plural wire portions of the connection pad wiring pattern 78 and 88, respectively.

Figure 8:
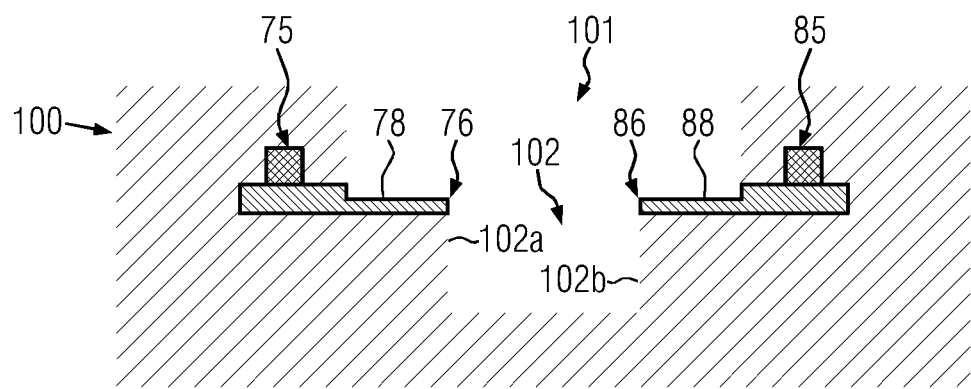
FIG. 8 schematically shows a cross sectional view along line a-a in FIG. 7.

Referring to FIG. 8, a cross sectional view along line a-a in FIG. 7 is schematically shown, indicating that the connections pads 70 and 80 are embedded into the substrate 100 of the prelam body. In particular, FIG. 8 shows the card body of FIG. 7 at a stage during processing when the cavities 101 and 102 are formed in the substrate 100. The cavity 101 is formed so as to expose wire portions 78 and 88 within the cavity 101 such that these wire portions may be brought into contact with a respective terminal (not illustrated) of a module (not illustrated) to be accommodated into the cavity 101. As shown in FIG. 8, the cavity 101 is formed by milling into the substrate 101 at the location of the connection pads 70 and 80 in FIG. 7 such that upper surface regions of wire portions 78 and 88 are exposed, for example, the wire portions 78 and 88 being partially removed during the milling. The wire portions of the connection pads 70 and 80 are located within a common plane, thereby defining a contacting pad plane as represented by reference numeral 89 in FIG. 8. With respect to the contacting pad plane 89, the bridging wire portions 75 and 85 are located outside the contacting pad plane, for example, on top of the wire portions and in electrical and mechanical contact with the wire portions of the connection pads 70 and 80. Alternatively, the bridging wire portions 75 and 85 may be located below the contacting pad plane 89, although this is not explicitly shown in FIG. 8.

With ongoing reference to FIGS. 7 and 8, the cavity 102 is milled into the substrate 100, thereby potentially removing portions of the wire portions of the connection pad wiring patterns 73 and 83 as indicated by cutting edges 76 and 86 in alignment with the cavity edges 102a and 102b of the cavity 102. The cutting edges 76 and 86 may completely remove turning portions, which correspond to turning portions 9a to 9e of the connection pad 1 shown in FIG. 1. Without depending on the particular shape of the connection pad wiring pattern 73 and 83, the formation of cavity 102 may remove portions of the wire portions such that the wire portions may be disconnected at the site of the cutting edges 76 and 86. It is then easy to see that the presence of the bridging wire portions 75 and 85 provide an electrical connection among the wire portions of the connection pad wiring patterns 73 and 83. Therefore, the bridging wire portions 75, 85 allow to avoid the problem of disconnected wire portions of connections pads when forming connection pads at close proximity to the cavity 102.

Figure 9:
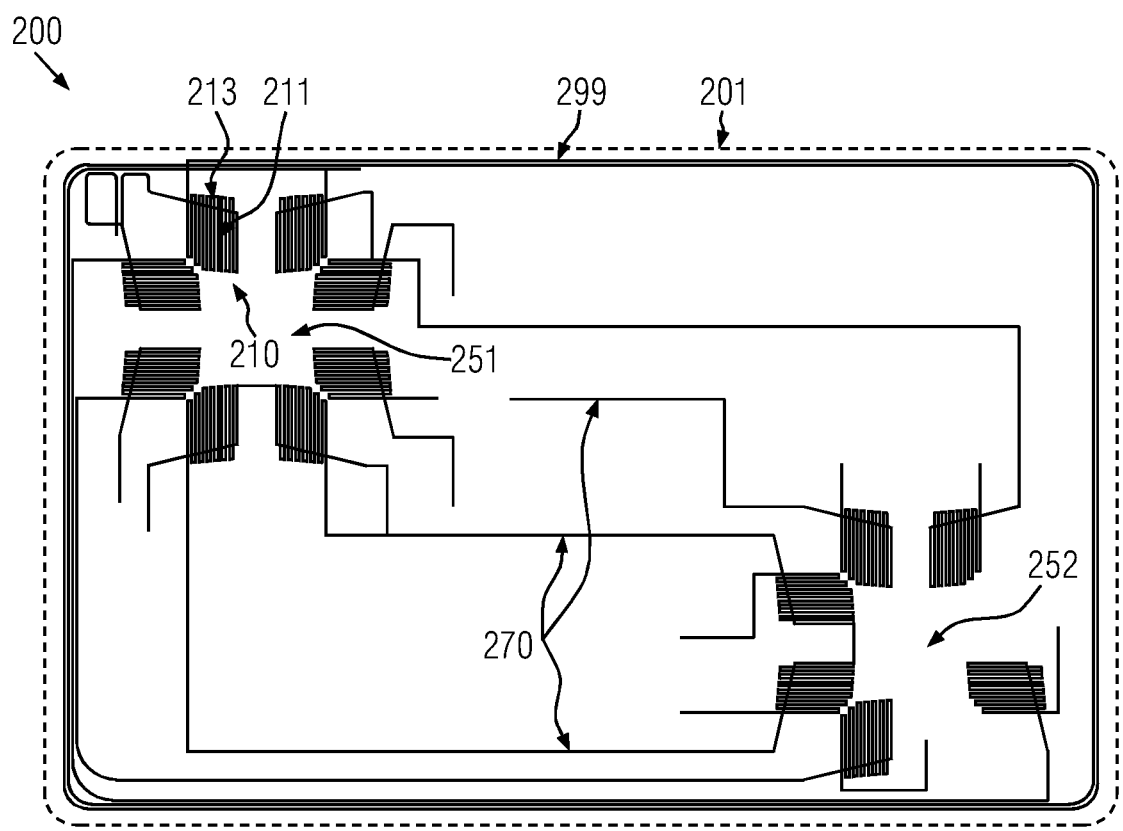
FIG. 9 schematically shows a prelam body in accordance with some illustrative embodiments of the present disclosure.

Referring to FIG. 9, a top view of a layout of a smart card 200 is schematically shown, the layout being obtained in accordance with an x-ray imaging of the smart card 200. The smart card 200 is illustrated at a stage during fabrication at which no module is implanted into the smart card 200 yet. According to the layout shown in FIG. 9, the smart card 200 has a card body 201 with connection pads 210 and 220 being formed at internal contact regions 251 and 252. For example, the contact region 251 may have eight connection pads formed in the card body, while the contact region 252 may have six connection pads formed at the card body 201. The connection pads may serve for interconnecting modules to be arranged at the connection regions 251 and 252 with each other, as well as interconnecting an antenna module 299 with at least one of the modules (not illustrated). Between the contacting regions 251 and 252, interconnections 270 may extend for interconnecting connection pads of the different contact regions. The connection pads may be formed by wire portions 211 and turning portions 213 in accordance with a wire pad design as shown in FIG. 1. This does not pose any limitation to the present disclosure and at least one connection pad may be provided by another wire pad design as illustrated in one of FIGS. 2 to 6.

Figure 10:
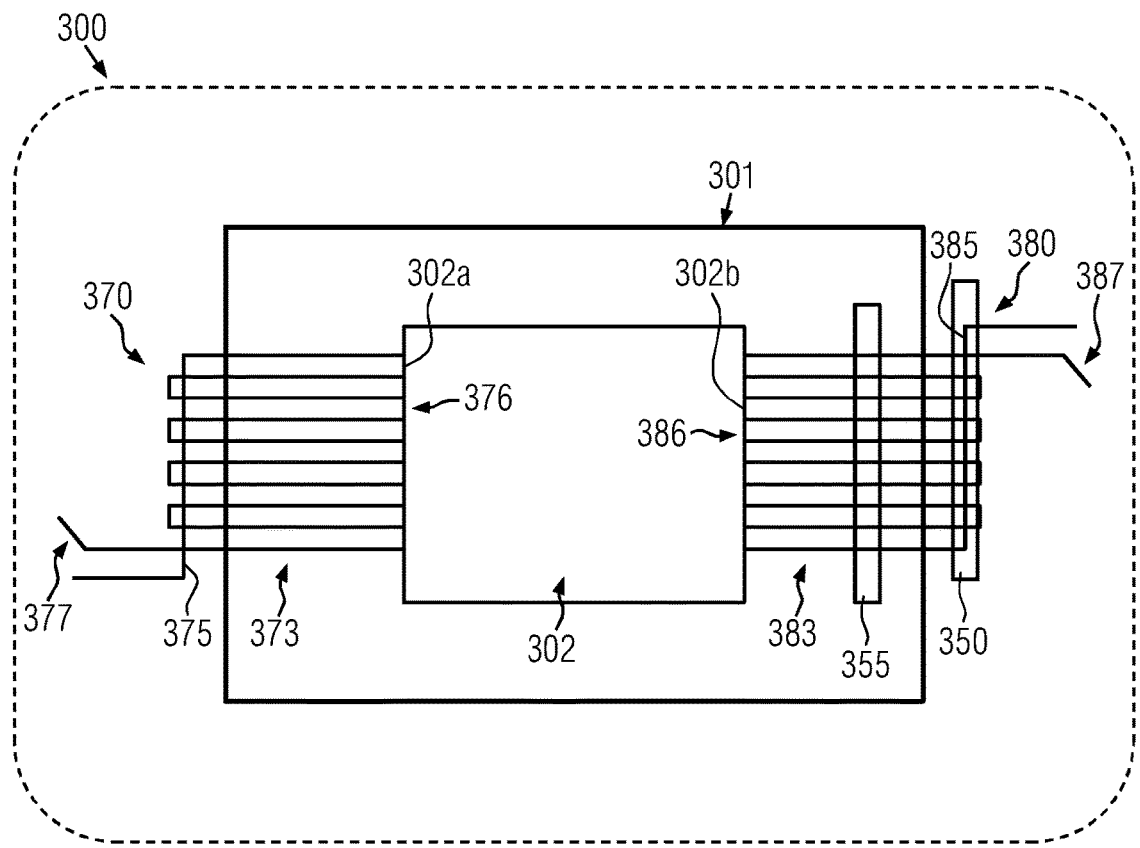
FIG. 10 schematically shows an enlarged view of a portion of a prelam body in accordance with some other illustrative embodiments of the present disclosure.

Referring to FIG. 10 and depending on a stage during fabrication of a smart card, a portion of a prelam body (at an early stage during fabrication) or a portion of a card of a smart card (at a more advanced stage during fabrication) is schematically illustrated in an enlarged top view, the prelam body or card body having a substrate 300.

According to illustrative embodiments, a connection pad 370 and a connection pad 380 are embedded into the substrate 300 for contacting terminals (not illustrated) of a module (not illustrated), which is to be integrated into the substrate 300. As shown in FIG. 10, each of the connection pads 370 and 380 are realized similar to the connection pad 1 shown in FIG. 1. In the illustrated example, each of the connection pads 370 and 380 in FIG. 10 is given by a meander like routing pattern. However, this does not pose any limitation on the present disclosure and at least one of the connection pads 370 and 380 may be replaced by a connection pad according to the connection pads illustrated in FIGS. 2 to 6, instead.

With ongoing reference to FIG. 10, a cavity 301 is shown, together with an option cavity 302. The cavity 301 is formed to accommodate a module (not illustrated) which is to be integrated into the substrate 300. The person skilled in the art will appreciate that, depending on the module to be integrated into the substrate 300, it may be necessary to further provide a cavity 302 in addition to the cavity 301. Accordingly, the cavity 302 is optional. Dimensions of the cavity 301 (and the optional cavity 302) may correspond to the X and Y dimensions of the cavity 101 (and the optional cavity 102) as described above with regard to FIG. 7, the disclosure of which being incorporated in total by reference. In particular (although not being explicitly illustrated in FIG. 10), the cavity 301 has dimensions in X and Y directions corresponding to the cavity 101 having double arrows X-P2 and Y-P1 in FIG. 7.

According to illustrative embodiments and as illustrated in FIG. 10, an orientation of the wire portions of a connection pad wiring pattern 373, 383 of a respective one of the connection pads 370 and 380 is substantially perpendicular to a Y direction, and an angle between the wire portions and the Y direction can be in a range from about 45° to 90°. Due to the orientation of the connection pads 370 and 380 as shown in FIG. 10, it is possible to increase the number of connection pads without being in conflict with each other due to a limited space of the cavities 301.

With ongoing reference to FIG. 10 and similar to FIG. 7, each of the connection pads 370 and 380 has a respective bridging wire portion 375 and 385 (similar to respective bridging wire portions 75 and 85 in FIG. 7), which connects plural wire portions of the connection pad wiring pattern 378 and 388, respectively.

Furthermore, the cavity 302 is milled into the substrate 300, thereby potentially removing portions of the wire portions of the connection pad wiring patterns 373 and 383 as indicated by cutting edges 376 and 386 in alignment with cavity edges 302a and 302b of the cavity 302. The cutting edges 376 and 386 may completely remove turning portions, which correspond to turning portions 9a to 9e of the connection pad 1 shown in FIG. 1. Without depending on the particular shape of the connection pad wiring pattern 373 and 383, the formation of cavity 302 may remove portions of the wire portions such that the wire portions may be disconnected at the site of the cutting edges 376 and 386. It is then easy to see that the presence of the bridging wire portions 375 and 385 provide an electrical connection among the wire portions of the connection pad wiring patterns 373 and 383. Therefore, the bridging wire portions 375, 385 allow to avoid the problem of disconnected wire portions of connections pads when forming connection pads at close proximity to the cavity 102.

Differing from the prelam body as shown in FIG. 7, the substrate 300 of FIG. 10 has a recess 350 formed in the substrate 300. The recess 350 is formed in the substrate 300 below the connection pad wiring pattern 380. In some illustrative examples herein, the recess 350 at least partially extends into the substrate 300 along a thickness direction of the substrate. As shown in FIG. 10, the bridging wire portion 385 is accommodated into the recess 350. For example, the recess 350 may extend through the substrate 300 so as to allow to insert a tool from the back side of the substrate 300 (i.e., a side opposite the side in which the cavity 301 is formed) into the recess 350. The tool may then allow to bring the bridging wiring portion 385 into mechanical and electrical contact with the connection pad wiring pattern 383 for fixing the bridging wiring portion 385 to the connection pad wiring pattern 383. Accordingly, it may be avoided that the tool, e.g., a tool with a heating tip or a laser for attaching the bridging wiring portion 385 to the connection pad wiring pattern 383 via welding, micro-welding and the like, from damaging the substrate 300.

According to some illustrative embodiments and as illustrated in FIG. 10, a recess 355 may be additionally or alternatively formed in the substrate 300, the recess 355 being located at least in part below the connection pad wiring pattern 383. That is, the wire portions of the connection pad wiring pattern 383 may extend across the recess 350. The recess 355 avoids a local accumulation of substrate material in the pad area as it is the case because of the connection pad wiring pattern displacing material of the substrate 300 when being embedded into the substrate 300. This means, the displaced material of the substrate 300 accumulates at the connection pad wiring pattern 383 and locally causes a variation in the thickness of the substrate. Due to the recess 355, such a local accumulation of material of the substrate 300 is avoided by compensating the displaced material, thereby ensuring a uniform thickness in the prelam body at the connection pad wiring pattern 383.

Although the recesses 350 and 355 are described above with regard to the connection pad wiring pattern 383, this does not pose any limitation on the present disclosure and the person skilled in the art will appreciate that one or more according recesses may be formed at any other connection pad wiring pattern, e.g., at the connection pad wiring pattern 373, as well.

Although only one recess 355 is described above, this does not impose any limitation and one or more additional recesses may be formed below a connection pad wiring pattern such that wiring portions of the connection pad wiring pattern extend across the one or more additional recesses.

Figure 11:
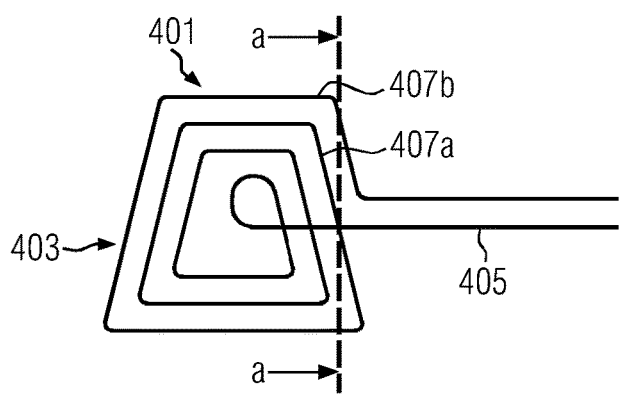
FIG. 11 schematically shows a wire pad design of a connection pad in accordance with some other illustrative embodiments of the present disclosure.
Figure 12:
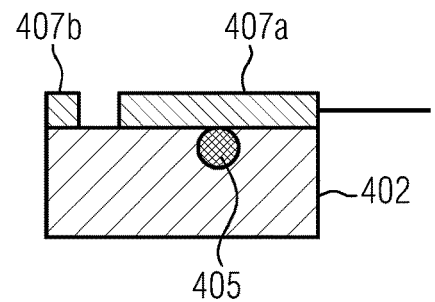
FIG. 12 schematically shows a cross sectional view along line b-b in FIG. 11.

Referring to FIG. 11, a wire pad design of a connection pad 401 in a card body of a smart card in accordance with some other illustrative embodiments is schematically illustrated in a top view, whereas FIG. 12 indicates a cross sectional view along line b-b in FIG. 11.

FIG. 11 shows the connection pad 401 with a connection pad wiring pattern 403 and a bridging wire portion 405, wherein plural wire portions 407a and 407b of the connection pad wiring pattern 403 define a contacting pad plane. The bridging wire portion 405 is located outside the contacting pad plane.

Referring to FIG. 12, the bridging wire portion 405 is embedded into a substrate 402 of the prelam body. For example, the bridging wire portion 405 may be embedded into a recess (not illustrated) in FIG. 12 prior to the formation of the connection pads wiring pattern 403. Accordingly, when forming the connection pad 401, a recess (not illustrated) is formed in the substrate 402 and the bridging wire portion 405 is embedded into the recess, as shown in FIG. 12. Subsequently, the connection pad wiring pattern 403 is formed on an upper surface of the substrate 402 in the connection pad plane such that the bridging wire portion 405 is located outside the connection pad plane.

The connection pad wiring pattern 403 as shown in FIG. 11 is not limited to a particular shape and the person skilled in the art will appreciate that any of the connection pad wiring patterns 1, 20, 30, 40, and 50 as described with regard to FIGS. 1 to 6 above may be used in replacement of the explicitly shown connection pad wiring pattern 403 without departing from this disclosure. In particular, the disclosure of each of the connection pad wiring patterns 1, 20, 30, 40, and 50 as described with regard to FIGS. 1 to 6 applies at this point of the description as well, and is incorporated here by reference in its entirety.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent.

A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. Wire pad design of a connection pad in a prelam body of a smart card, the wire pad design comprising:
   a connection pad wiring pattern formed by plural wire portions extending in a contacting pad plane;
   a bridging wire portion which at least partially extends outside the contacting pad plane;
   and wherein a wire forming the wire pad design by routing the wire to provide the connection pad wiring pattern and the bridging wire portion,
   wherein the bridging wire portion electrically and mechanically connects at least some of the plural wire portions with each other.

2. Wire pad design of claim 1, wherein at least some of the wire portions partially extend in parallel.

3. Wire pad design of claim 2, wherein a turning portion is located between each two neighboring wire portions extending in parallel with each other, the bridging wire portion substantially extending across the parallel wire portions.

4. Wire pad design of claim 1, wherein the connection pad wiring pattern is a spirally shaped routing pattern or a meander-like routing pattern or a pattern of plural circular shaped forms which partially overlap each other.

5. Wire pad design of claim 1, wherein a wiring density of the connection pad wiring pattern is varying.

6. Wire pad design of claim 1, wherein a ratio of wire diameter to wire pitch in the connection pad wiring pattern is in a range from about 0.3 to about 0.95.

7. Wire pad design of claim 6, the connection pad wiring pattern having at least one first portion in which the ratio is in the range from about 0.3 to about 0.8 and at least one second portion in which the ratio is in the range greater than 0.8 and smaller than or equal to about 0.95.

8. Wire pad design of claim 1, wherein the plural wire portions have a wire pitch of at least 300 μm, preferably of at least 200 μm, more preferably of at least 100 μm, and wherein the plural wire portions have a diameter in a range from about 50 μm to about 300 μm, preferably in a range from about 50 μm to about 200 μm or from about 80 μm to about 300 μm, more preferably from about 80 μm to about 200 μm.

9. Wire pad design of claim 1, wherein the wire portions and/or the bridging wire portion are made of copper, a copper alloy or a copper tin alloy or aluminum or an aluminum alloy, preferably at least some of the plurality of wires may be at least partially covered by an insulating coating or may be without any covering.

10. Prelam body having a substrate with at least one connection pad embedded into the substrate, the at least one connection pad being formed in accordance with the wire pad design comprising:
    a connection pad wiring pattern formed by plural wire portions extending in a contacting pad plane;
    a bridging wire portion which at least partially extends outside the contacting pad plane:
    and wherein a wire forming the wire pad design by routing the wire to provide the connection pad wiring pattern and the bridging wire portion,
    wherein the bridging wire portion electrically and mechanically connects at least some of the plural wire portions with each other.

11. Prelam body of claim 10, further comprising a first recess formed in the substrate below the connection pad wiring pattern, the first recess at least partially extending into the substrate along a thickness direction of the substrate.

12. Prelam body of claim 11, wherein the bridging wire portion is accommodated into the first recess.

13. Prelam body of claim 12, further comprising a second recess formed in the substrate below the connection pad wiring pattern, the connection pad wiring pattern straddling over at least a part of the second recess.

14. Prelam body of claim 10, at least some of the wire portions partially extend in parallel, and wherein at least one turning portion is removed.

15. Prelam body of claim 10, wherein the prelam body is of a rectangular shape in a top view with a length dimension along a length direction and a width dimension smaller than the length dimension along a width direction perpendicular to the length direction in the top view, wherein wire portions are oriented relative to the width dimension under an angle out of a range from about 45° to about 90°.

16. Smart card comprising:
    a prelam body having a substrate with at least one connection pad embedded into the substrate, the at least one connection pad being formed in accordance with a wire pad design comprising:
        a connection pad wiring pattern formed by plural wire portions extending in a contacting pad plane;
        a bridging wire portion which at least partially extends outside the contacting pad plane; and wherein a wire forming the wire pad design is by routing the wire routed to provide the connection pad wiring pattern and the bridging wire portion,
        wherein the bridging wire portion electrically and mechanically connects at least some of the plural wire portions with each other; and
    a module integrated into the prelam body,
    wherein the module has at least one input/output (I/O) terminal for electrically connecting with the at least one connection pad, and wherein the module has at least one I/O terminal for electrically connecting with the at least one connection pad, wherein the module is accommodated into a cavity provided in the prelam body adjacent the at least one connection pad such that the at least one I/O terminal is brought into electrical contact with the at least one connection pad.

17. Smart card of claim 16, wherein the electrical contact between the at least one I/O terminal and the at least one connection pad is formed by at least one of a solder interconnection, an adhesive interconnection using an anisotropic conductive film (ACF) or anisotropic conductive paste (ACP), and an adhesive interconnection using an isotropic conductive film or paste (ICP) glue interconnection.

18. Smart card of claim 16, wherein the cavity is formed at a side of the at least one connection pad, which side is facing away from a side of the connection pad where the bridging wire portion is formed.

19. Method of forming a wire pad design of a connection pad in a prelam body of a smart card, comprising:
- providing a substrate of the prelam body;
- forming a connection pad wiring pattern by plural wire portions on a surface of the substrate as a contacting pad plane;
- forming a bridging wire portion which at least partially extends outside the contacting pad plane; and
- forming the wire pad design by routing a wire to provide the connection pad wiring pattern and the bridging wire portion,
- wherein the bridging wire portion is in electrical and mechanical connection with at least some of the plural wire portions.

20. Method of claim 19, wherein the bridging wire portion is formed so as to at least partially extend over the connection pad wiring pattern.

21. Method of claim 19, further comprising forming a first recess in the substrate prior to forming any of the connection pad wiring pattern and the bridging wire portion, and subsequently forming the bridging wire portion by accommodating a wire portion into the first recess, followed by forming the connection pad wiring pattern on the surface of the substrate outside the first recess.

22. Method of claim 19, further comprising, forming a second recess in the substrate, the second recess being located at least in part below the connection pad wiring pattern, the wire portions extending across the second recess.

23. Method of forming a smart card, comprising:
- providing a card body formed from a prelam body with at least one connection pad embedded therein, the at least one connection pad being provided by a wire pad design formed by: providing a substrate of the prelam body, forming a connection pad wiring pattern by plural wire portions on a surface of the substrate as a contacting pad plane;
- forming a bridging wire portion which at least partially extends outside the contacting pad plane; and forming the wire pad design by routing a wire to provide the connection pad wiring pattern and the bridging wire portion,
- wherein the bridging wire portion is in electrical and mechanical connection with at least some of the plural wire portions;
- forming a cavity in the card body by milling the cavity into the card body so as to expose the at least one connection pad; and
- accommodating a module having at least one I/O terminal into a cavity adjacent the at least one connection pad such that the at least one I/O terminal is brought into electrical contact with the at least one connection pad.

* * * * *